United States Patent [19]

Mizuno et al.

[11] 4,254,010

[45] Mar. 3, 1981

[54] GLASS FIBER-REINFORCED RESIN COMPOSITION

[75] Inventors: Shioji Mizuno, Osaka; Tsuneyuki Adachi, Nara, both of Japan

[73] Assignee: Dainippon Ink and Chemicals, Inc., Tokyo, Japan

[21] Appl. No.: 26,359

[22] Filed: Apr. 2, 1979

[30] Foreign Application Priority Data

Apr. 6, 1978 [JP] Japan ................................. 53-39728

[51] Int. Cl.³ .............................................. C08K 3/40
[52] U.S. Cl. ................................. 260/40 TN; 525/440
[58] Field of Search .................. 260/40 TN; 528/273; 525/440

[56] References Cited

U.S. PATENT DOCUMENTS

| | | | |
|---|---|---|---|
| 3,290,165 | 12/1966 | Iannicelli | 106/308 |
| 4,022,752 | 5/1977 | Horn et al. | 528/273 X |
| 4,085,086 | 4/1978 | Mizuno et al. | 260/40 TN |
| 4,110,302 | 8/1978 | Thomas et al. | 528/273 X |

FOREIGN PATENT DOCUMENTS

2206804  8/1973  Fed. Rep. of Germany .

*Primary Examiner*—Melvyn I. Marquis
*Attorney, Agent, or Firm*—Sherman & Shalloway

[57] ABSTRACT

A glass fiber-reinforced thermoplastic resin composition comprising (I) a thermoplastic polyurethane derived from polybutylene terephthalate and a polyfunctional isocyanate and (II) glass fibers surface-coated with 0.05 to 3% by weight of an aminosilane or epoxy silane and having a length of 0.01 to 0.2 mm and a length-to-diameter ratio of 1.5 to 20. The composition can give molded articles having high mechanical strength and thermal stability and being free from warpage.

17 Claims, No Drawings

GLASS FIBER-REINFORCED RESIN COMPOSITION

This invention relates to a glass fiber-reinforced resin composition capable of affording molded articles which have high mechanical strength and thermal stability and which do not deform.

Polybutylene terephthalate (PBT for short) obtained by condensing terephthalic acid or its ester with 1,4-butanediol is a crystalline thermoplastic polymer, and has low water absorption and superior mechanical properties, thermal properties, electrical properties and chemical resistance. For this reason, PBT is gaining much acceptance in the field of molding materials as a resin which is equivalent to, or better than, polyacetal or nylon. Glass fiber-reinforced PBT obtained by incorporating glass fibers having a length (L) to diameter (D) ratio (L/D) of higher than about 30 into PBT has very much increased mechanical strength and heat stability, and therefore, can be used as substitutes for metals in the field of thin plate working and die casting. However, during injection molding of this glass fiber-reinforced PBT, the glass fibers are oriented in the flowing direction of the resin in the molded article. Hence, the shrinkage of the molded article is anisotropic. Thus, the glass fiber-reinforced PBT has the defect that "deformation" or "warpage" occurs, or the glass fibers rise to the surface of the molded article so that the surface becomes non-smooth and roughened.

It is generally said that to achieve mechanical strength and heat stability in molded articles prepared from such glass fiber-reinforced PBT, the glass fibers contained in the molded articles should have an L/D ratio of more than about 30. On the other hand, to remove anisotropy and deformation from the molded articles, glass fibers having a low L/D ratio, and ultimately bead-like glass fibers having an L/D of 1, are desired. Certainly, the inclusion of such glass fibers into PBT will remove deformation of molded articles, but their strength is reduced. In some cases, the molded articles will be broken only by a small force required to release the molded articles from the molds after the molding operation.

It is known to incorporate a filler coated with a silane-type coupling agent into the resin in order to improve adhesion between the filler and the resin in the reinforced resin and to increase its strength. However, PBT including epoxysilane-coated glass fibers having an L/D ratio of not more than 20 has higher strength than PBT containing glass fibers not coated with an epoxysilane, but has a lower strength than PBT not containing glass fibers. Thus, such PBT gives only brittle molded articles that are not suited for practical application.

It has been desired therefore to develop glass fiber-reinforced resin composition having superior mechanical strength and heat stability and being free from deformation, warpage, and surface roughening.

It is an object of this invention to provide a glass fiber-reinforced resin composition capable of meeting this desire.

The present inventors have found that a resin composition obtained by incorporating glass fibers coated with a specified silane and having a relatively low L/D value into a certain thermoplastic polyurethane derived from PBT achieves the object of this invention.

Thus, according to this invention, there are provided a glass fiber-reinforced thermoplastic resin composition comprising (I) a thermoplastic polyurethane derived from PBT, preferably hydroxyl-terminated PBT having an intrinsic viscosity [$\eta$] of 0.2 to 0.6, and (II) glass fibers surface-coated with 0.05 to 3% by weight of an aminosilane or epoxysilane and having a length of 0.01 to 0.2 mm and a length-to-diameter ratio of from 1.5 to 20, preferably having a diameter of 0.005 mm to 0.02 mm; and a molded article produced from such a glass fiber-reinforced thermoplastic resin composition.

The present inventors thought that glass fibers having an L/D more than 20 are desirable for removing deformation in molded articles, and glass fibers having an L/D of about 20 are desirable for increasing strength. As a result of various investigations based on this thought, the present inventors employed in this invention short glass fibers obtained by pulverizing ordinary glass fibers by a special pulverizer which have high reactivity with silane-type coupling agents and good adhesion to the resin.

In the course of their investigations which finally led to the present invention, the present inventors attempted to modify PBT with a glycol such as ethylene glycol, or to attach an acid group, a hydroxyl group, etc. as a pendant chain to the main chain of PBT, or to blend PBT with another polymer such as polycarbonate. None of these attempts have proved to be effective. Then, the present inventors noted a thermoplastic polyurethane based on PBT, and incorporated the aforesaid coated glass fibers. As a result, they found that the resulting resin composition has improved strength, especially markedly increased impact strength. This marked increase in strength is attributed presumably to the fact that the resin and the glass fibers are bonded firmly through the coupling agent because the bonding between the glass fibers and the silane compound as the coupling agent is strong and the urethane group of the resin reacts with the amino group or epoxy group of the silane compound to form a firm bond.

Furthermore, the present invention has the following noteworthy advantages. Firstly, because glass fibers having a high L/D ratio are not used, there can be obtained molded articles having a smooth and lusterous surface, close to the surface condition of the resin itself, which is not obtainable with ordinary glass fiber-reinforced resins. Secondly, the molded articles have superior coatability. Specifically, the adhesion to these molded articles of a coated film from a polyurethane or epoxy resin paint is complete. When a baking-type alkyd melamine or acrylic paint is coated on such a molded article and baked at 150° C. for 30 minutes, the molded article does not at all deform, and the adhesion of the coated film is exceptionally good. For example, in a crosscut tape test which comprises providing eleven parallel cuts both lengthwise and crosswise in a coated film sample at intervals of 1 mm to form 100 square sections, applying an adhesive tape intimately to the cut surface of the sample, peeling off the adhesive tape, counting the number of square sections which remain adhering to the substrate, and expressing the counted number against the total number (100) of the square sections, the result is generally 100/100.

Thirdly, although the weld strength of a molded article produced from PBT reinforced with long glass fibers having an L/D ratio of more than 20 is usually about one-half of that of a molded article produced from PBT reinforced with glass fibers having a lower L/D ratio, the molded article in accordance with this invention has a sufficiently high weld strength despite the use of glass fibers having a relatively low L/D ratio.

PBT as one starting material of the thermoplastic polyurethane (I) is low-molecular-weight PBT having an active hydrogen atom at its both ends which is obtained by condensation reaction between terephthalic acid or an alkyl ($C_1$-$C_4$) terephthalate and 1,4-butanediol. Preferably, PBT has an intrinsic viscosity [$\eta$] of 0.2 to 0.6. The hydroxyl value (the number of milligrams of KOH which is equivalent to the hydroxyl groups per gram of the sample) is preferably 9 to 37, especially preferably 11 to 28. PBT whose terminal groups consist solely of hydroxyl groups is preferred. However, some of the terminal groups may be converted to carboxyl groups, in which case the acid value (the number of milligrams of KOH which reacts with carboxyl groups per gram of the sample) of the PBT is desirably not more than 10, and is not more than one-third of its hydroxyl value. As the molecular weight of PBT is lower, the number of urethane groups in the polyurethane becomes larger, and the adhesion of the resin to glass increases. However, in such a case, the heat stability of the urethane linkages is low, and the reinforced product tends to undergo heat decomposition during the molding operation. Consequently, the properties of the molded product tend to be degraded, or the molded product tends to be colored yellow. On the other hand, when the molecular weight of PBT becomes too high, the resulting polyurethane necessarily has a small amount of urethane linkages, and its adhesion to glass is reduced. Thus, a molded article having practical strength cannot be obtained.

The intrinsic viscosity [$\eta$], as referred to in the present invention, is determined by dissolving 0.1 g, 0.25 g, and 1.0 g, respectively, of PBT in 25 ml of a 6:4 (by weight) mixture of phenol and tetrachloroethane, and measuring the relative viscosity of each of the solutions at 30° C. in a customary manner.

Copolymers obtained by replacing less than 50% by weight of the acid component and/or alcohol component of the PBT, and copolymerizing the resulting components can also be used in this invention instead of PBT. Examples of such copolymer components are isophthalic acid, adipic acid, ethylene glycol, propylene glycol, 1,2- or 1,3-butanediol, and 1,6-hexanediol.

The polyfunctional isocyanate as the other starting material for the thermoplastic polyurethane (I) is a polyisocyanate containing at least two isocyanate groups in the molecule, and preferably a diisocyanate of the general formula

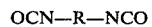

wherein R represents a divalent aromatic, aliphatic or alicyclic radical. Specific examples of the polyfunctional isocyanate include aliphatic diisocyanates such as tetramethylene diisocyanate and hexamethylene diisocyanate; aromatic diisocyanate such as 2,4-tolylene diisocyanate, 2,6-tolylene diisocyanate, 4,4'-diphenylmethane diisocyanate, m-phenylene diisocyanate, p-phenylene diisocyanate, and 1,5-naphthalene diisocyanate; and alicyclic diisocyanates such as dicyclohexylmethane diisocyanate. Crude diphenylmethane diisocyanate, a dimer of tolylene diisocyanate, a dimer of 4,4'-diphenylmethane diisocyanate, and isocyanurate compounds can also be used.

In the production of the thermoplastic polyurethane (I), the ratio between PBT and the polyisocyanate is desirably such that the number of functional groups is substantially the same for both ingredients. In some cases, they may be used in such a ratio that the number of isocyanate groups is within the range of 0.8 to 1.5 per active hydrogen atom of PBT.

PBT of the desired molecular weight can be produced, for example, by ester interchange reaction of dimethyl therephthalate and a molar excess, based on the dimethyl terephthalate, of 1,4-butanediol in the presence of a catalyst at 130° to 260° C., followed by condensation under reduced pressure. The hydroxyl value of the resulting PBT can be easily determined by reacting the terminal hydroxyl groups with succinic anhydride, and determining the resulting carboxyl groups, as disclosed, for example, in Makromolekulare Chem. 17, 219–230 (1956).

The thermoplastic polyurethane (I) can be obtained by a known method. For example, it can be produced by melting PBT at 240° C. in a reaction kettle for high-viscosity resins, adding an equivalent weight of 4,4'-diphenylmethane diisocyanate to react it with PBT, taking out the reaction product from the kettle 5 minutes after the viscosity of the resin rises abruptly, cooling the reaction product and pelletizing it. Because the melt viscosity of polyurethane (I) is much higher than that of PBT, a special reaction kettle for high-viscosity resins is required. In some cases, a continuous reaction apparatus for high-viscosity resins, such as a twin-screw extruder, can be advantageously used.

Generally, in the production of ordinary polyurethanes, a chain extender such as 1,4-butanediol is used. In the present invention, however, the use of a chain extender leads to the necessity of using an increased amount of the polyisocyanate, and this may drastically change the properties of the final resin composition. For this reason, the amount of a chain extender, if used, should be not more than 10% based on PBT. Suitable chain extenders are 1,4-butanediol and bishydroxyethyl terephthalate.

As stated hereinabove, the L/D value of glass fibers is desirably low to prevent deformation of the molded article, and the L/D value is desirably high to increase strength. To meet the two requirements at the same time, glass fibers having an L/D ratio of from 1.5 to 20, preferably from 2 to 15 are used in this invention. The glass fibers have a length (L) of 0.01 to 0.2 mm, preferably 0.03 to 0.15 mm, and a diameter (D) of preferably 0.005 to 0.02 mm, more preferably 0.009 to 0.013 mm. When the diameter or length, especially the latter, of the glass fibers is too large, the molded article has a poor surface finish, and loses its merchandise value. On the other hand, if it is too small, the desired reinforcing effect cannot be expected. The glass fibers are produced by pulverizing ordinary glass fibers of a fixed diameter by a pulverizing machine, and sieving the pulverized glass fibers according to the desired length.

The glass fibers (II) of this invention coated with an aminosilane or epoxysilane are produced by treating the glass fibers of the aforesaid dimension with the aminosilane or epoxysilane. Preferred aminosilanes or epoxysilanes are liquid compounds of the general formula

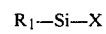

wherein $R_1$ represents a group having at least one amino or epoxy group, and X represents a hydroxyl group or a group capable of forming a hydroxyl group upon reaction with water, such as an alkoxy group or halgenoxyl group. Examples of the aminosilanes are γ-aminopropyltriethoxy silane, N-β-(aminoethyl)-γ-aminopropyltrimethoxy silane, γ-ureidopropyltriethoxy silane, and N-β-(aminoethyl)-γ-aminopropyldimethoxymethyl silane. Examples of the epoxysilanes are γ-glycidoxypropyltrimethoxy silane, γ-glycidoxypropyltriethoxy silane, and β-(3,4-epoxycyclohexyl)ethyltrimethoxy silane.

The glass fibers should be coated with 0.05 to 3% by weight (i.e., 0.05 to 3 parts by weight per 100 parts by weight of the glass fibers), preferably 0.1 to 1% by weight, of the aminosilane or epoxysilane. Since the length of the glass fibers is short, the increase of strength depends greatly upon the amount of the aminosilane or epoxysilane as a coupling agent. For this reason, the amount of the coupling agent is an important factor in this invention.

The aminosilanes or epoxysilanes are described, for example, in British Pat. No. 1,069,752 and "SPI", 27th, 21-A. C. D.

The aminosilane or epoxysilane as a coupling agent is generally liquid, and since its amount to be used is small, it is applied to the glass fibers from its solution in water in a certain fixed concentration. Coating of the glass fibers can be performed, for example, by applying the solution to glass fibers whose dimension has not yet been adjusted to the one specified in the present invention, drying the coated glass fibers to remove water, and then pulverizing the glass fibers to the predetermined dimension; or by applying this solution to glass fibers having the dimension specified in this invention, and then drying the coated glass fibers to remove water. Another method is conceivable which comprises adding the coupling agent while mixing the polyurethane with the glass fibers. In such a method, water must be added to the system to hydrolyze the coupling agent and react it with the glass fibers, and at this time, the hydrolysis of the polyurethane occurs as a side-reaction. Hence, this method is not desirable.

The glass fiber reinforced thermoplastic resin composition of this invention consists of 100 parts by weight of the thermoplastic polyurethane (I) and 10 to 200 parts, preferably 30 to 150 parts by weight, of the glass fibers (II) coated with the aforesaid coupling agent. The mechanical strength and thermal stability of the composition have to do with the amount of the coated glass fibers (II), and generally, become better as the amount of the glass fibers is larger. If the amount of the glass fibers (II) is less than 10 parts by weight, the desired effect cannot be achieved. On the other hand, when its amount exceeds 200 parts by weight, the resulting glass fiber-reinforced resin composition is difficult to mold by an injection molding technique, and the glass fibers rise to the surface of the molded article to present a roughened luster-free surface. The most suitable amount of the coated glass fibers (II) is 25 to 120 parts by weight per 100 parts by weight of the thermoplastic polyurethane (I).

The thermoplastic polyurethane (I) and the coated glass fibers (II) are mixed in a customary manner. For example, by mixing them continuously in an extruder, pellets of uniform properties can be obtained with good productivity. Both a single-screw and a twin-screw extruders can be used, but the latter is preferred because of its better productivity. Generally, a suitable mode of mixing is to mix them at a temperature of 210° to 260° C. for a period of 0.2 to 20 minutes. Alternatively, a method is also applicable which comprises dispersing the coated glass fibers (II) in a system in which the thermoplastic polyurethane (I) is being produced. This method has much higher productivity since it can be performed in a single step. Specifically, a mixture of low-molecular-weight PBT, the polyisocyanate and glass fibers coated with the coupling agent is first prepared, and then the mixture is fed into a twin-screw extruder to perform a urethanization reaction at a temperature of 210° to 260° C. for 1 to 20 minutes thereby to produce the thermoplastic polyurethane (I) and simultaneously to disperse the coated glass fibers (II) therein.

In the present invention, less than 50% by weight of the thermoplastic polyurethane (I) can be replaced by another polymer. Examples of such a polymer include polystyrene, polypropylene, an ethylene/vinyl acetate copolymer, an ethylene/acrylate copolymer, an ethylene/propylene copolymer, polystyrene, AS resin, ABS resin, polyamides, polyacetal, polycarbonate, polyethylene terephthalate, polyphenylene oxide, polyvinyl chloride, chlorinated polyethylene, and thermoplastic polyurethanes other than the thermoplastic polyurethane (I) used in this invention.

Optionally, the composition of this invention may include inorganic fillers other than the glass fibers, such as calcium meta-silicate, calcium silicate, glass beads, glass powder, quartz powder, clay, talc, calcium carbonate, and mica powder.

The composition of this invention may further contain other additives such as nucleating agents, pigments, dyes, plasticizers, mold releasing agents, lubricants, heat stabilizers, antioxidants, ultraviolet absorbers, blowing agents, and fire retardants.

The following examples further illustrate the present invention specifically. In these examples, parts are by weight.

SYNTHESIS EXAMPLE 1 (synthesis of PBT-1)

A reaction vessel was charged with 194 parts of dimethyl terephthalate and 135 parts of 1,4-butanediol. They were heated to 150° C. to form a uniform solution. While the solution was stirred under a nitrogen stream, 0.04 part of tetraisopropyl titanate as a catalyst was added. Soon, ester interchange began, and by-product methanol began to distill out. The temperature of the system was gradually raised, and when the temperature rose to about 220° C. at which temperature the distillation of methanol almost stopped, the system was gradually evacuated, and condensation was allowed to proceed. After maintaining the reaction mixture at 250° C. and 10 mmHg for 2 hours, the reaction was stopped, and the resulting resin was taken out. The resulting PBT had an intrinsic viscosity [η] of 0.38, a hydroxyl value of 17.5 and an acid value of 0.45. The product is designated as PBT-1.

SYNTHESIS EXAMPLE 2 (synthesis of PBT-2)

By operating in the same way as in Synthesis Example 1 except that the condensation reaction time was prolonged, PBT was obtained which had an intrinsic viscosity [η] of 0.45, a hydroxyl value of 10.5 and an acid value of 0.72. The product was designated as PBT 2.

SYNTHESIS EXAMPLE 3 (synthesis of PBT-3)

By operating in the same way as in Synthesis Example 1 except that the degree of vacuum at the time of condensation was adjusted to 0.5 mmHg, high-molecular-weight PBT having an intrinsic viscosity [η] of 1.0 was obtained. The product was designated as PBT-3.

SYNTHESIS EXAMPLE 4 (synthesis of polyurethane-1)

One hundred parts of PBT-1 was placed in a reaction kettle for high-viscosity resins, and dissolved at 240° C. under a nitrogen stream. With stirring, 5.6 parts of 4,4'-diphenylmethane diisocyanate was placed into the reactor, whereupon the reaction proceeded rapidly and the viscosity of the resin increased. Five minutes later, the resin was taken out of the reaction kettle. The resulting resin had an intrinsic viscosity [η] of 1.0. The product is designated as polyurethane-1.

SYNTHESIS EXAMPLE 5 (synthesis of glass fibers coated with a coupling agent—"Glass B")

One hundred parts of a glass fiber mixture having an average length of 0.07 mm composed of 20% of glass fibers having a diameter of 0.013 mm and a length of 0.1 to 0.2 mm, 10% of glass fibers having a diameter of 0.013 mm and a length of less than 0.04 mm and 70% of glass fibers having a diameter of 0.013 mm and a length of 0.1 to 0.04 mm was uniformly mixed with an aqueous solution of 0.3 part of γ-aminopropyltriethoxy silane (NUC Silane Coupling Agent A-1100, a trademark for a product of Nippon Unicar Co., Ltd.) in 100 parts of water. The mixture was dried in a drier at 120° C. to remove the water completely. Thus, glass fibers coated with the silane coupling agent (to be referred to as glass-E) were obtained.

SYNTHESIS EXAMPLE 6 (synthesis of glass fibers coated with coupling agents—"glasses A, C, D, E and F")

In the same way as in Synthesis Example 5, glass fibers coated with the various silane coupling agents shown in Table 1 (glasses A, C, D, E and F) were produced.

EXAMPLE 1

PBT-1 obtained in Synthesis Example 1 (47.3 parts), 2.7 parts of 4,4'-diphenylmethane diisocyanate (MDI for short) and 50 parts of Glass-B obtained in Synthesis Example 5 were uniformly mixed in a tumbler-type mixer. The mixture was fed into a vent-equipped 65 mm extruder heated at 250° C., and heated and kneaded, and pelletized. The residence time of the mixture in the extruder cylinder was 3 minutes. The pellets obtained were molded by a 3-ounce injection molding machine to make test pieces for the measurement of properties, and a circular sheet having a thickness of 1.6 mm and a diameter of 100 mm (with one side gate). The resulting polyurethane had an intrinsic viscosity [η] of 0.9. The test pieces showed a tensile strength (TS for short) of 800 kg/cm$^2$, a tensile elongation (TE for short) of 1.6%, a flexural strength (FS for short) of 1,350 kg/cm$^2$, a flexural modulus (FM for short) of $8 \times 10^4$ kg/cm$^2$, and an Izod impact strength (unnotched; II for short) of 65 kg.cm/cm. The circular sheet was completely free from warpage, and showed a smooth surface finish. The shrinkage of the circular sheet during molding was 0.9% both in the direction of the flow of the resin and in a direction at right angles to the flowing direction, showing no anisotropy.

COMPARATIVE EXAMPLE 1

PBT-3 obtained in Synthesis Example 3 (47.3 parts), 2.7 parts of MDI and 50 parts of a chopped strand of glass fibers were pre-mixed. The chopped strand of glass fibers had been produced by treating glass fibers having a diameter of 0.013 mm and a length of 6 mm with an aqueous solution containing 0.3 part of γ-aminopropyltriethoxy silane (A-1100) per 100 parts of the glass fibers, drying the treated glass fibers to remove water, and bundling 800 glass fibers so coated.

TABLE 1

| Glass fibers | Diameter (mm) | Length (distribution, %) 0.2–0.1mm | 0.1–0.04mm | less than 0.04mm | Average length (mm) | Silane coupling agent | Amount of the silane coupling agent coated (wt. % based on the glass fibers) |
|---|---|---|---|---|---|---|---|
| Glass-A | 0.013 | 20 | 70 | 10 | 0.07 | γ-glycidoxypropyltrimethoxy silane (*) | 0.05 |
| Glass-B | " | " | " | " | " | γ-aminopropyltriethoxy silane (**) | 0.3 |
| Glass-C | " | " | " | " | " | γ-glycidoxypropyltrimethoxy silane (*) | 0.3 |
| Glass D | " | " | " | " | " | γ-glycidoxypropyltrimethoxy silane (*) | 0.2 |
| Glass-E | " | " | " | " | " | γ-glycidoxypropyltrimethoxy silane (*) | 0.1 |
| Glass-F | 0.010 | 10 | 60 | 30 | 0.05 | γ-glycidoxypropyltrimethoxy silane (*) | 0.5 |

(*): A-187 (Nippon Unicar);
(**): A-1100 (Nippon Unicar).

The mixture was precessed in an extruder, and then molded into test pieces and a circular sheet in the same way as in Example 1.

The resulting polymer had an intrinsic viscosity [η] of 0.9. The test pieces had a TS of 1,600 kg/cm$^2$, a TE of 1.0%, an FS of 2,300 kg/cm$^2$, an FM of 1.2×10$^5$ kg/cm$^2$, and an II of 80 kg.cm/cm. The circular sheet had a roughened surface with the glass fibers rising to the surface. The molding shrinkage of the fiber-reinforced resin was 0.3% in the direction of the flow of the resin, and 1.2% in a direction at right angles to the flowing direction, showing large anisotropy. Thus, the molded article greatly deformed.

EXAMPLE 2

First 50 parts of polyurethane-1 obtained in Synthesis Example 4 and 50 parts of glass-C obtained in Synthesis Example 6 were uniformly mixed. The mixture was kneaded and pelletized in a 90 mm extruder having the cylinder temperature set at 235° C. The pellets were molded by an injection molding machine to form test pieces and a circular sheet. The test pieces had a TS of 900 kg/cm$^2$, a TE of 1.8%, an FS of 1,500 kg/cm$^2$, an FM of 9×10$^4$ kg/cm$^2$ and an II of 70 kg.cm/cm. The circular sheet has had a smooth flat surface, and was free from deformation.

COMPARATIVE EXAMPLE 2

The procedure of Example 2 was repeated except that PBT-3 of Synthesis Example 3 was changed to polyurethane-1 of Synthesis Example 4. The resulting test pieces showed a TS of 550 kg/cm$^2$, a TE of 1.0%, an FS of 950 kg/cm$^2$, an FM of 7×10$^4$ kg/cm$^2$, and an II of 35 kg.cm/cm. Clearly, there was almost no effect of strength increase in view of the fact that the test pieces of polyurethane-1 of Synthesis Example 4 themselves had a TS of 550 kg/cm$^2$ and an FS of 900 kg/cm$^2$. The circular sheet did not deform, but had a somewhat roughened surface finish.

EXAMPLES 3 to 5

In Example 2, pellets were produced by using glass-D, glass-E, and glass-A, respectively, instead of glass-C. The pellets were molded, and the properties of the molded articles are shown in Table 2. The results show that when the amount of the epoxysilane coated decreases, the strength of the molded articles decreases.

EXAMPLE 6

Pellets were produced in the same way as in Example 2 using 67.5 parts of PBT-2, 2.5 parts of MDI and 30 parts of glass-C. Test pieces and a circular sheet were produced from the resulting pellets. The test pieces showed a TS of 750 kg/cm$^2$, a TE of 2.5%, an FS of 1,200 kg/cm$^2$, an FM of 6×10$^4$ kg/cm$^2$, and an II of 55 kg.cm/cm. The circular sheet had a smooth surface, and did not at all deform. The molding shrinkage of the fiber-reinforced resin was 1% both in the resin flowing direction and in a direction at right angles to it.

COMPARATIVE EXAMPLE 3

Pellets were produced in the same way as in Example 6 except that PBT-3 was used instead of PBT-2. Test pieces produced from the resulting pellets had a TS of 400 kg/cm$^2$, a TE of 0.8%, an FS of 760 kg/cm$^2$, an FM of 6×10$^4$ kg/cm$^2$ and an II of 25 kg.cm/cm.

EXAMPLE 7

Pellets were produced in the same way as in Example 1 except that glass-F was used instead of glass-B. Test pieces and a circular sheet were produced from the pellets in the same way as in Example 1. The test pieces showed a TS of 850 kg/cm$^2$, a TE of 2.0%, an FS of 1,400 kg/cm$^2$, an FM of 8×10$^4$ kg/cm$^2$, and an II of 70 kg.cm/cm. The circular sheet had a smooth surface finish, and did not deform at all.

EXAMPLE 8

Pellets were produced in the same way as in Example 2 using 40 parts of polyurethane-1, 30 parts of glass-C and 30 parts of needle-like calcium meta-silicate (wollastonite). Test pieces and a circular sheet were produced from the pellets in the same way as in Example 2. The test pieces had a TS of 870 kg/cm$^2$, a TE of 1.6%, an FS of 1,390, an FM of 10×10$^4$ kg/cm$^2$ and an II of 55 kg.cm/cm. The circular sheet showed a smooth flat surface finish, and did not at all deform.

TABLE 2

| Example (Ex.) or Comparative Example (CEx.) | Polymer (parts) | MDI (parts) | Filler (parts) | Glass fibers (parts) | Type of coupling agent | Amount of the coupling agent (% based on the weight of glass fibers) |
| --- | --- | --- | --- | --- | --- | --- |
| Ex. 1 | PBT-1 47.3 | 2.7 | — | Glass-B 50 | A-1100 | 0.3 |
| CEx. 1 | PBT-3 47.3 | 2.7 | — | Glass fibers (*) 50 | A-1100 | 0.3 |
| Ex. 2 | Polyurethane-1 50 | — | — | Glass-C 50 | A-187 | 0.3 |
| CEx. 2 | PBT-3 50 | — | — | Glass-C 50 | A-187 | 0.3 |
| Blank | PBT-3 100 | — | — | — | — | — |
| Ex. 3 | Polyurethane-1 50 | — | — | Glass-D 50 | A-187 | 0.2 |
| Ex. 4 | Polyurethane-1 50 | — | — | Glass-E 50 | A-187 | 0.1 |
| Ex. 5 | Polyurethane-1 50 | — | — | Glass-A 50 | A-187 | 0.05 |
| Ex. 6 | PBT-2 67.5 | 2.5 | — | Glass-C 30 | A-187 | 0.3 |
| CEx. 3 | PBT-3 67.5 | 2.5 | — | Glass-C 30 | A-187 | 0.3 |
| Ex. 7 | PBT-1 | 2.7 | — | Glass-F | A-1100 | 0.3 |

TABLE 2-continued

| | | | | | | Surface finish of the molded article | Deformation of the circular sheet | Molding shrinkage (%) Flow direction/ normal direction |
|---|---|---|---|---|---|---|---|---|
| Ex. 8 | 47.3 Polyurethane-1 40 | — | 30 (**) | 50 Glass-C 30 | A-187 | | | 0.3 |

| Example (Ex.) or Comparative Example (CEx.) | TS (kg/cm²) | TE (%) | FS (kg/cm²) | FM (kg/cm²) | II (kg·cm/cm) | Surface finish of the molded article | Deformation of the circular sheet | Molding shrinkage (%) Flow direction/ normal direction |
|---|---|---|---|---|---|---|---|---|
| Ex. 1 | 800 | 1.6 | 1350 | $8 \times 10^4$ | 65 | Smooth | None | 0.9/0.9 |
| CEx. 1 | 1600 | 1.0 | 2300 | $1.2 \times 10^5$ | 80 | Roughened | Great deformation | 0.3/1.2 |
| Ex. 2 | 900 | 1.8 | 1500 | $9 \times 10^4$ | 70 | Smooth | None | — |
| CEx. 2 | 550 | 1.0 | 950 | $7 \times 10^4$ | 35 | Somewhat roughened | None | — |
| Blank | 550 | — | 900 | — | — | — | — | — |
| Ex. 3 | 750 | 1.6 | 1400 | $8.7 \times 10^4$ | 65 | Smooth | None | — |
| Ex. 4 | 700 | 1.4 | 1200 | $8 \times 10^4$ | 50 | Smooth | None | — |
| Ex. 5 | 600 | 1.2 | 1000 | $7 \times 10^4$ | 40 | Smooth | None | — |
| Ex. 6 | 750 | 2.5 | 1200 | $6 \times 10^4$ | 55 | Smooth | None | 1/1 |
| CEx. 3 | 400 | 0.8 | 760 | $6 \times 10^4$ | 25 | — | — | — |
| Ex. 7 | 850 | 2.0 | 1400 | $8 \times 10^4$ | 70 | Smooth | None | — |
| Ex. 8 | 870 | 1.6 | 1390 | $10 \times 10^4$ | 55 | Smooth | None | — |

(*): Average length 6 mm (outside the scope of the present invention)
(**): Needle-like calcium meta-silicate

What we claim is:

1. A glass fiber-reinforced thermoplastic resin composition comprising
   (I) a thermoplastic polyurethane derived from hydroxyl-terminated polybutylene terephthalate having an intrinsic viscosity of 0.2 to 0.6 and a polyfunctional isocyanate, and
   (II) glass fibers coated with 0.05 to 3% by weight of an aminosilane or an epoxysilane and having a length of 0.01 mm to 0.2 mm and a length-to-diameter ratio of from 1.5 to 20.

2. The composition of claim 1 which comprises 100 parts by weight of the thermoplastic polyurethane (I) and 10 to 200 parts by weight of the coated glass fibers (II).

3. The composition of claim 1 wherein the glass fibers have a diameter of from 0.005 mm to 0.02 mm.

4. The composition of claim 1 wherein the polyfunctional isocyanate is a diisocyanate of the general formula

OCN—R—NCO wherein R represents a divalent aromatic, aliphatic or alicyclic radical.

5. The composition of claim 1 wherein the aminosilane or epoxysilane is a liquid compound of the general formula $R_1$—Si—X wherein $R_1$ represents a group having at least one amino or epoxy group, and X represents a hydroxyl group or a group capable of forming a hydroxyl group upon reaction with water.

6. A process for producing a glass fiber-reinforced thermoplastic resin composition, which comprises kneading (I) a thermoplastic polyurethane derived from a hydroxy-terminated polybutylene terephthalate having an intrinsic viscosity of 0.2 to 0.4 and a polyfunctional isocyanate with (II) glass fibers coated with 0.05 to 3% by weight of an aminosilane or epoxysilane and having a length of from 0.01 mm to 0.2 mm and a length-to-diameter ratio of from 1.5 to 20 at an elevated temperature.

7. A process for producing a glass fiber-reinforced thermoplastic resin composition comprising (I) a thermoplastic polyurethane derived from hydroxyl-terminated polybutylene terephthalate having an intrinsic value of 0.2 to 0.6 and a polyfunctional isocyanate and (II) glass fibers coated with 0.05 to 3% by weight of an aminosilane or epoxysilane and having a length of from 0.01 mm to 0.2 mm and a length-to-diameter ratio of from 1.5 to 20, which comprises reacting the polybutylene terephthalate with the polyfunctional isocyanate in the presence of the coated glass fibers (II).

8. A molded article produced from the glass fiber-reinforced thermoplastic resin composition of any one of claims 1, 2, or 5.

9. The composition of claim 1 wherein the hydroxyl-terminated polybutylene terephthalate has an hydroxyl value of from 11 to 28.

10. The composition of claim 4 wherein the thermoplastic polyurethane is derived from the reaction between the polybutylene terephthalate and isocyanate in a ratio such that the number of isocyanate groups is within the range of 0.8 to 1.5 per active hydrogen atom of the polybutylene terephthalate.

11. The composition of claim 1 wherein the length-to-diameter ratio is from 2 to 15; the glass fibers have a length of from 0.03 to 0.15 and a diameter of from 0.009 to 0.013 mm.

12. The composition of claim 1 which comprises 100 parts by weight of the thermoplastic polyurethane (I) and 30 to 150 parts by weight of the coated glass fibers (II).

13. The composition of claim 1 which comprises 100 parts by weight of the thermoplastic polyurethane (I) and 25 to 120 parts by weight of the coated glass fibers (II).

14. The composition of claim 1 wherein the glass fibers are coated with 0.1 to 1% by weight of the aminosilane or epoxysilane coupling agent.

15. A glass fiber-reinforced thermoplastic resin composition comprising:
   (I) a thermoplastic polyurethane which is the reaction product of hydroxyl-terminated polybutylene terephthalate having an intrinsic viscosity of 0.2 to 0.6 and an hydroxyl value of from 9 to 37 and a polyfunctional isocyanate having the formula

wherein R represents a divalent aromatic, aliphatic or alicyclic radical at a ratio such that the number of isocyanate groups of the polyfunctional isocyanate is within the range of 0.8 to 1.5 per active hydrogen atom of the hydroxyl-terminated polybutylene terephthalate; and
(II) 10 to 200 parts by weight, per 100 parts by weight of the termoplastic polyurethane (I) of glass fibers having a length of 0.01 mm to 0.2 mm, a diameter of from 0.005 mm to 0.02 mm and a length-to-diameter ratio of from 1.5 to 20 wherein the glass fibers are coated with 0.05 to 3% by weight of an aminosilane or epoxysilane liquid coupling agent of the formula

wherein $R_1$ represents a group having at least one amino or epoxy group, and X represents a hydroxyl group or a group capable of forming a hydroxyl group upon reaction with water.

16. The composition of claim 15 which comprises 100 parts by weight of the thermoplastic polyurethane (I) and 30 to 150 parts by weight of the coated glass fibers (II); wherein the polyfunctional isocyanate is a member selected from the group consisting of tetramethylene diisocyanate, hexamethylene diisocyanate, 2,4-tolyene diisocyanate, 2,6-tolylene diisocyanate, 4,4'-diphenylmethane diisocyanate, m-phenylene diisocyanate, p-phenylene diisocyanate, 1,5-napthalene diisocyanate and dicyclohexylmethane diisocyanate; the aminosilane or epoxysilane liquid coupling compound is a member selected from the group consisting of γ-aminopropyltriethoxy silane, N-β-(aminoethyl)-γ-aminopropyltrimethoxy silane, γ-ureidopropyltriethoxy silane, N-β-(aminoethyl)-γ-aminopropyldimethoxymethyl silane, γ-glycidoxypropyltriethoxy silane, γ-glycidoxypropyltrimethoxy silane, β-(3,4-epoxycyclohexyl)ethyltrimethoxy silane; said glass fibers being coated with from 0.1 to 1% by weight of the aminosilane or epoxysilane.

17. The composition of claim 16 wherein the glass fibers have a length of from 0.03 to 0.15 mm, a diameter of from 0.009 to 0.013 mm and a length-to-diameter ratio of from 2 to 15.

* * * * *